(12) United States Patent
Han et al.

(10) Patent No.: US 12,725,731 B2
(45) Date of Patent: Sep. 1, 2026

(54) TRANSFORMER FOR LDC OF ELECTRIC VEHICLE

(71) Applicant: ATUM CO., LTD., Gyeonggi-do (KR)

(72) Inventors: Taeksoo Han, Seoul (KR); Hyunchuel Kim, Gyeonggi-do (KR)

(73) Assignee: ATUM CO., LTD., Ansan-si (KR)

( * ) Notice: Subject to any disclaimer, the term of this patent is extended or adjusted under 35 U.S.C. 154(b) by 889 days.

(21) Appl. No.: 18/094,516

(22) Filed: Jan. 9, 2023

(65) Prior Publication Data

US 2023/0335332 A1 Oct. 19, 2023

(30) Foreign Application Priority Data

Jan. 24, 2022 (KR) ...................... 10-2022- 0009969

(51) Int. Cl.

*H01F 27/30* (2006.01)
*B60L 53/20* (2019.01)
*H01F 27/28* (2006.01)
*H01F 27/32* (2006.01)
*H01F 30/06* (2006.01)
*H01F 41/12* (2006.01)

(52) U.S. Cl.

CPC ............ *H01F 27/306* (2013.01); *B60L 53/20* (2019.02); *H01F 27/2847* (2013.01); *H01F 27/324* (2013.01); *H01F 30/06* (2013.01); *H01F 41/12* (2013.01); *B60L 2210/10* (2013.01)

(58) Field of Classification Search

CPC .... H01F 27/306; H01F 27/2847; H01F 27/28; H01F 27/324
USPC .................................................. 336/198, 232
See application file for complete search history.

(56) References Cited

U.S. PATENT DOCUMENTS 5,359,313 A * 10/1994 Watanabe ............... H01F 30/10 336/83
6,522,233 B1 * 2/2003 Kyoso .................. H01F 27/324 336/200
9,865,390 B2 * 1/2018 Li ....................... H01F 27/2823
10,692,647 B2 * 6/2020 Kan ...................... H01F 27/325
2012/0002387 A1 * 1/2012 Park ....................... H05B 41/02 361/679.01
2014/0009251 A1 * 1/2014 Hsu ....................... H01F 27/085 336/57
2017/0365400 A1 * 12/2017 Watanabe ............ H01F 27/327

(Continued)

FOREIGN PATENT DOCUMENTS

CN 203774058 U * 8/2014
CN 205177580 U * 4/2016
CN 218333406 U * 1/2023

(Continued)

*Primary Examiner* — Shawki S Ismail
*Assistant Examiner* — Joselito S. Baisa
(74) *Attorney, Agent, or Firm* — NKL Law; Jae Youn Kim

(57) ABSTRACT

A transformer for an LDC of an electric vehicle includes: a plate-type primary coil for receiving current from the high voltage battery of the electric vehicle; a lower secondary coil element provided under the primary coil to supply an induced current induced by the primary coil to the electrical components of the electric vehicle; and an upper secondary coil element provided on the primary coil to supply an induced current induced by the primary coil to the electrical components of the electric vehicle, and according to this, there is an advantage of reducing the height and size of a product.

7 Claims, 6 Drawing Sheets

(56) References Cited

U.S. PATENT DOCUMENTS

2017/0367184 A1 * 12/2017 Wang ...................... H01F 27/28

FOREIGN PATENT DOCUMENTS

| | | | | |
|---|---|---|---|---|
| JP | 2003017334 A | * | 1/2003 |
| JP | 2004253732 A | * | 9/2004 |
| JP | 2005150195 A | * | 6/2005 |
| JP | 2015185725 A | * | 10/2015 |
| JP | 2017059735 A | * | 3/2017 |

* cited by examiner

TRANSFORMER FOR LDC OF ELECTRIC VEHICLE

BACKGROUND

The present invention relates to an low DC-DC converter (LDC) of an electric vehicle.

An electric vehicle (EV) defined as including a plug-in hybrid vehicle (PHEV), and this is the same throughout the specification is provided with an On-Board Charger (OBC) for charging a high voltage battery that drives the motor of the vehicle with commercial AC power (200V AC) supplied from an electric vehicle charger, the high voltage battery charged with power converted by and supplied from the OBC, a low DC-DC converter (LDC) for converting a high voltage of the high voltage battery into a low voltage of 12V and supplying power to a low-voltage battery or electrical components of the vehicle.

Particularly, the LDC embedded in the electric vehicle is a converter for converting power of the high voltage battery into power of a 12V low voltage battery, and although most of the components (headlight, wipers, pumps, control boards, and the like) of a vehicle operate at 12V, and an existing vehicle having an engine generates 12V as the engine functions as a generator, an electric vehicle requires a device for converting the high voltage charged in a high voltage battery into a low voltage, which is an operating voltage of electrical components.

The LDC embedded in an electric vehicle is configured to include a converter for converting DC voltage of a high voltage charger into high-frequency AC voltage through a full bridge circuit, an LDC transformer for converting the AC voltage of the converter into a low voltage and being insulated from the high voltage battery, and a rectifying unit for rectifying and smoothing the AC voltage and charging the low-voltage battery with the rectified AC voltage.

Here, the configuration of an LDC transformer according to the prior art will be described.

An LDC transformer according to the prior art includes a primary coil wound around a specially manufactured bobbin, and a separate insulation casing for insulation between the wound primary coil and a secondary coil.

However, the size of the transformer for an LDC of an electric vehicle according to the prior art is considerably large. There is a problem in that the size of a product itself of the primary coil is large as it is difficult to properly align the coil in the process of winding the primary coil around a specially designed bobbin, and the diameter of the product increases as it is inserted in a separate double casing to be insulated from the secondary coil, and therefore, the overall size increases, and this leads to a problem of increasing the overall size of the LDC.

SUMMARY OF THE INVENTION

Therefore, the present invention has been made in view of the above problems, and it is an object of the present invention to provide a transformer for an LDC of an electric vehicle, which is suitable for, first, transforming high current and high voltage with a simple configuration and a small size, second, further improving the efficiency, further reducing the height of a product (60% lower than a conventional LDC transformer), and further reducing the size of the product (55% smaller than the conventional LDC transformer), since the adhesiveness of the primary coil itself of the LDC transformer may be increased as the primary coil 110 of the LDC transformer is formed by fusing, and the loss is reduced by decreasing the distance and increasing the adhesiveness between the primary coil and the secondary coil, third, reducing the size of the LDC itself as the height of the LDC transformer is lowered and the size of the product is reduced, and improving product competitiveness of the LDC in the electric vehicle as the space occupied in the electric vehicle is reduced and the weight is also lowered, fourth, reducing the assembly process, significantly improving productivity, and increasing price competitiveness, since production of the primary coil of the LDC transformer can be automated as the production itself of the primary coil of the LDC transformer is performed by a winding jig, fifth, improving heating characteristic and EMI performance since it does not need to doubly adopt a separate bobbin to hold the primary winding, sixth, connecting the secondary coil elements in series with a simple configuration, and guaranteeing reliability of contact between the terminals for series connection, and seventh, mounting the LDC transformer easily and conveniently, and reducing the product size of the transformer more compactly, as the mounting units are formed on the terminals themselves of the lower copper plate coil and the upper copper plate coil without adopting separate mounting members.

To accomplish the above object, according to one aspect of the present invention, there is provided a transformer for an LDC of an electric vehicle, in an LDC of an electric vehicle for supplying power supplied from a high voltage battery of the electric vehicle to electrical components of the electric vehicle, the transformer comprising: a plate-type primary coil for receiving current from the high voltage battery of the electric vehicle; a lower secondary coil element provided to be tightly attached to the bottom surface of the primary coil under the primary coil to generate an induced current by the current flowing through the primary coil and supply the induced current to the electrical components of the electric vehicle; and an upper secondary coil element provided to be tightly attached to the top surface of the primary coil to generate an induced current by the current flowing through the primary coil and supply the induced current to the electrical components of the electric vehicle, wherein the primary coil is configured of a fusion-type fine line bunch wire manufactured by coating an insulative coalescing agent on a copper fine line bunch made by twisting several strands of copper fine lines, and is configured to include: an input wire unit connected to the high voltage battery of the electric vehicle, and formed of a straight fusion-type fine line bunch wire; a primary side winding unit formed to be extended from the input wire unit by winding the fusion-type fine line bunch wire a plurality of times in a plate shape to form a first central hole at the center; and a straight output wire unit connected to the high voltage battery of the electric vehicle at an end of the primary side winding unit.

DETAILED DESCRIPTION OF THE PREFERRED EMBODIMENT

Figure 1:
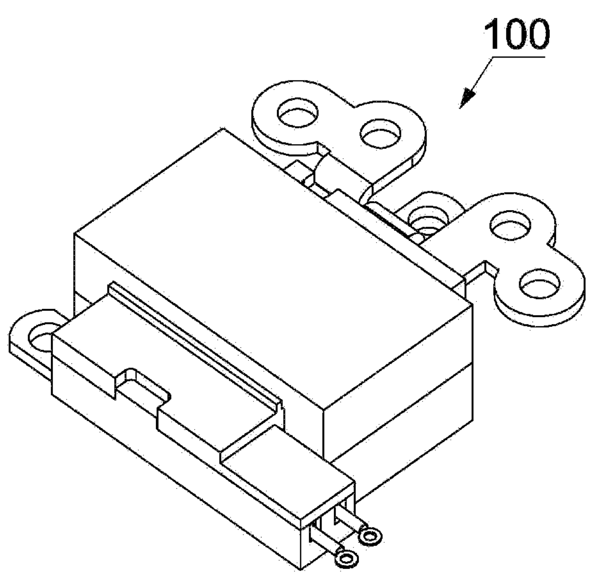
FIG. 1 is a perspective view showing a transformer 100 for an LDC of an electric vehicle according to an embodiment of the present invention.
Figure 2:
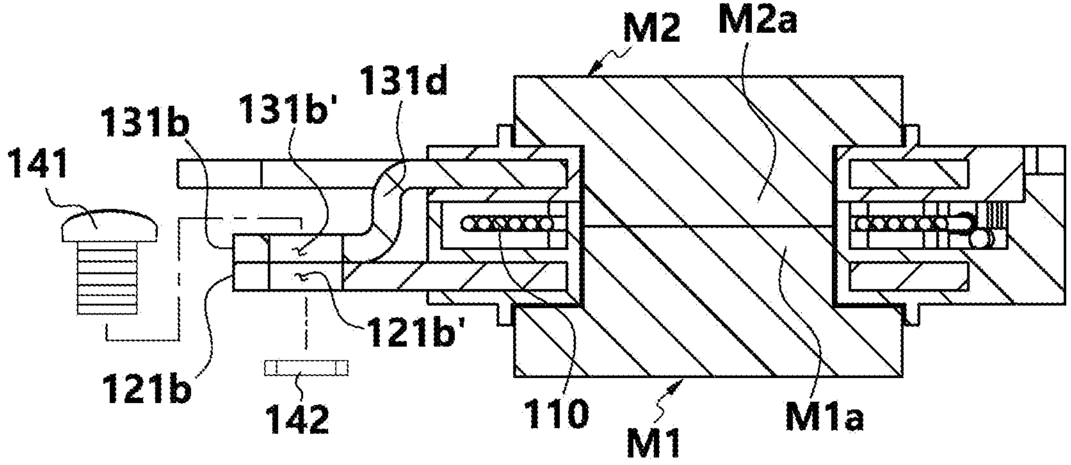
FIG. 2 is a cross-sectional view of FIG. 1.
Figure 3:
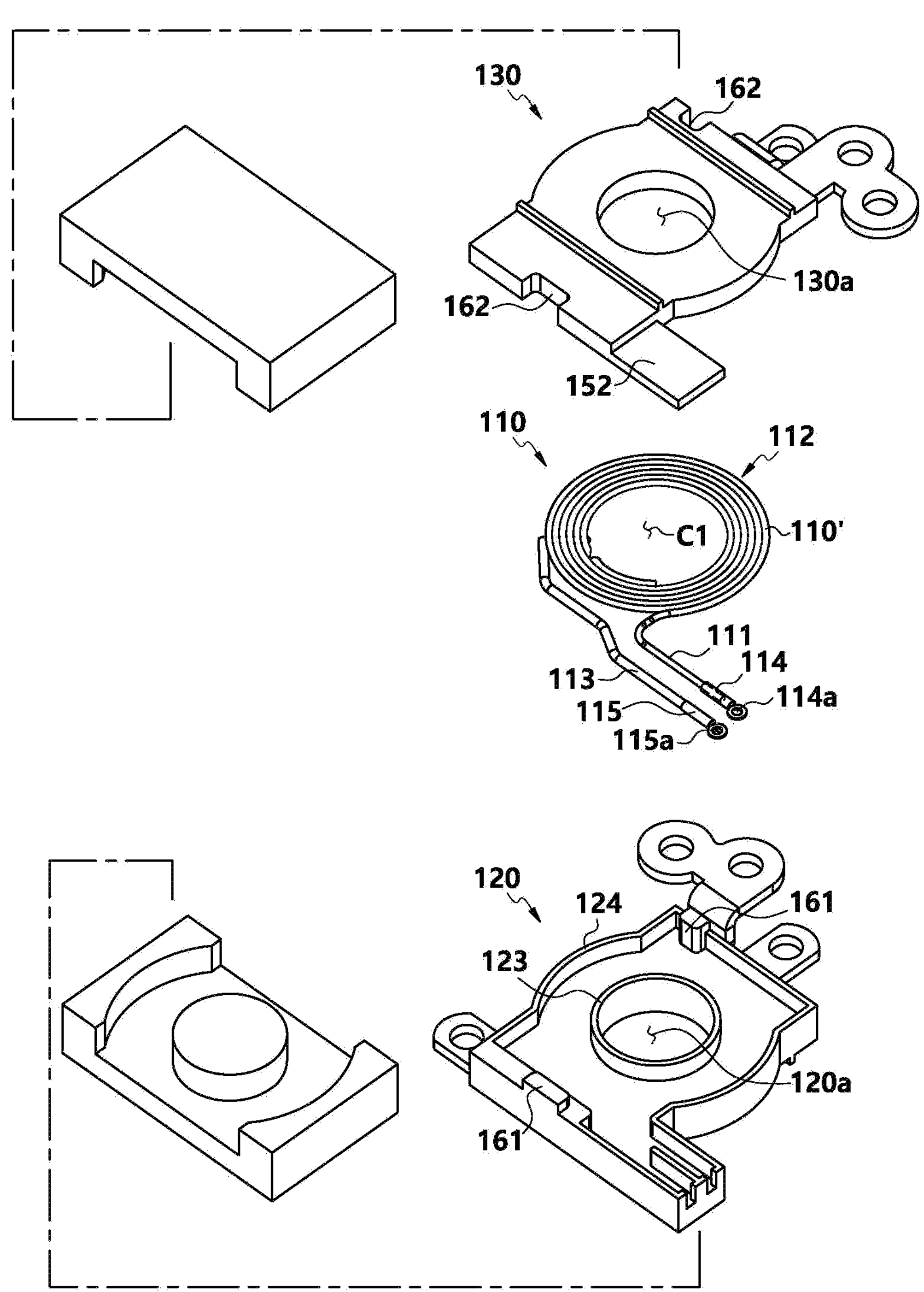
FIG. 3 is an exploded perspective view of FIG. 1.
Figure 4:
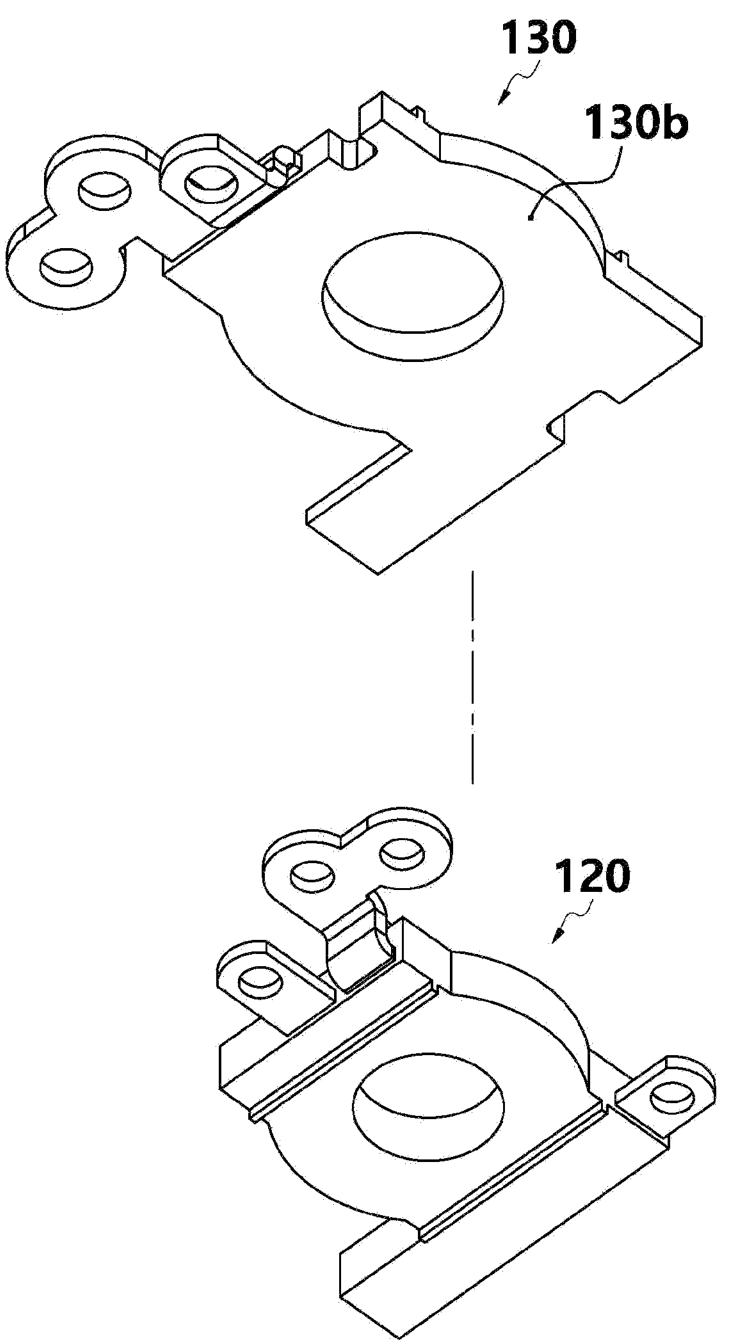
FIG. 4 is a perspective view showing the bottom surface of the main part in FIG. 2.
Figure 5:
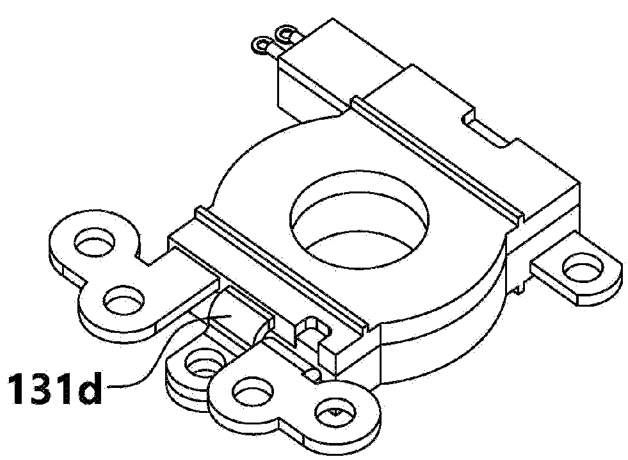
FIG. 5 is a perspective view showing a state in which magnetic cores M1 and M2 are excluded from a transformer 100 for an LDC of an electric vehicle according to an embodiment of the present invention.
Figure 6:
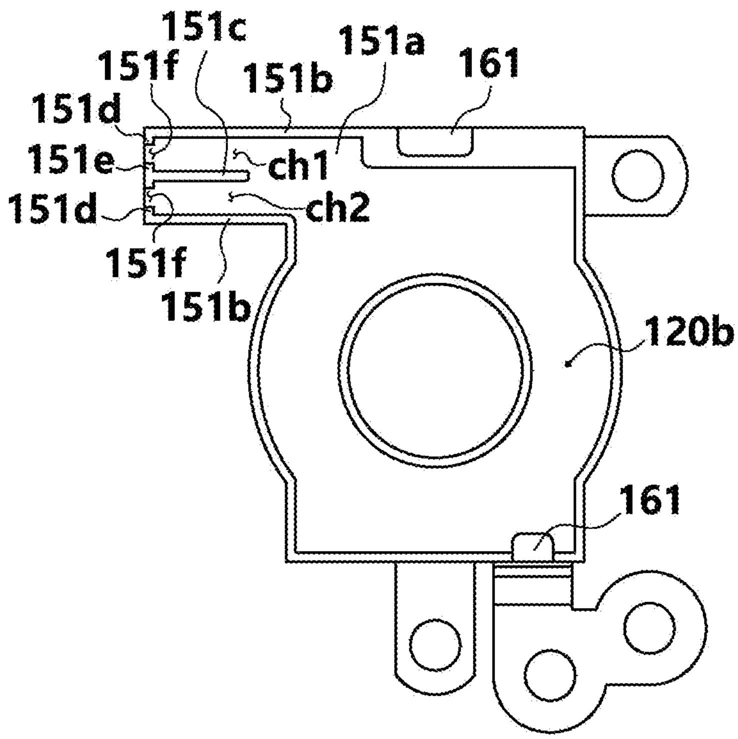
FIG. 6 is a plan view showing the primary coil 110.
Figure 7A:
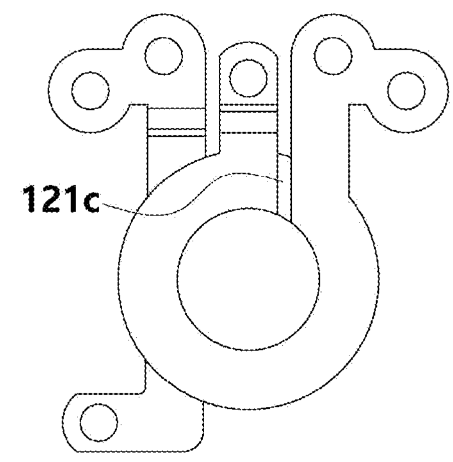
FIG. 7A is a plan view showing a state of coupling the lower copper plate coil 121.
Figure 7B:
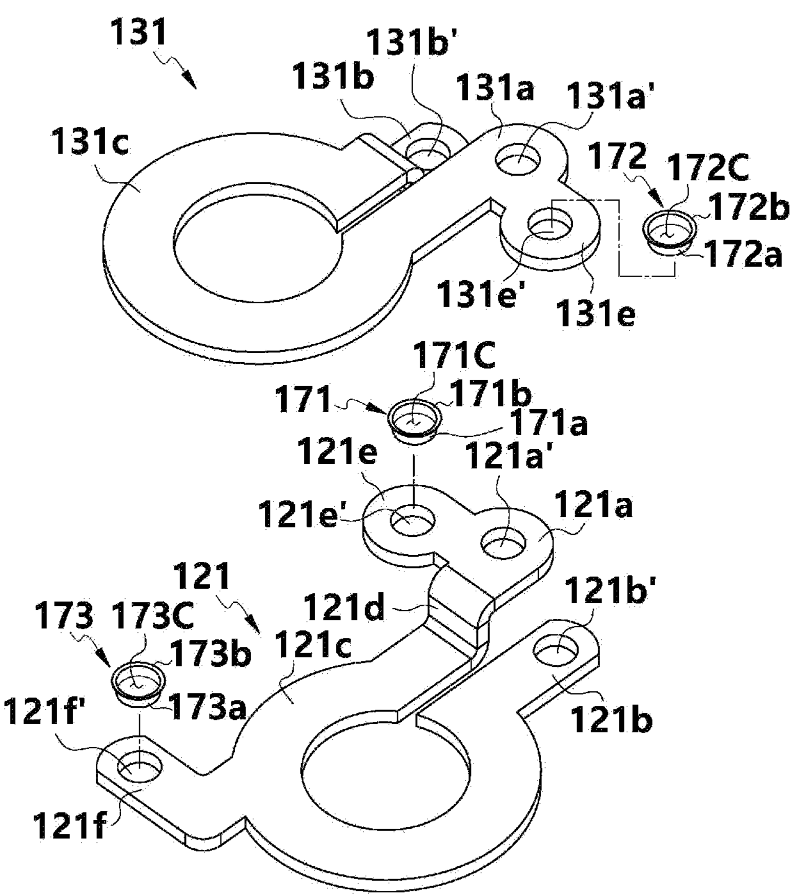
FIG. 7B is an exploded perspective view showing the lower copper plate coil 121.
Figure 8:
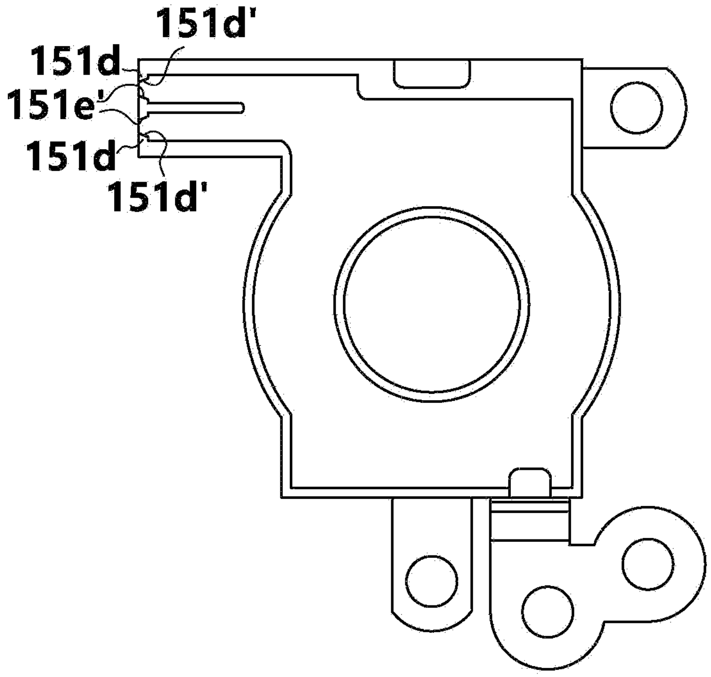
FIG. 8 is a plan view showing a primary coil 110 according to a modified embodiment in a transformer 100 for an LDC of an electric vehicle according to an embodiment of the present invention.

Hereinafter, a preferred embodiment of a transformer for an LDC of an electric vehicle according to the present invention will be described in detail with reference to the accompanying drawings.

In an LDC of an electric vehicle for supplying power supplied from a high voltage battery of the electric vehicle (including a plug-in hybrid vehicle, and this is the same throughout the specification) to electrical components of the electric vehicle, specifically, in an LDC of an electric vehicle configured to include: a converter for converting DC voltage of a high voltage charger into high-frequency AC voltage through a full bridge circuit; an LDC transformer for converting the AC voltage of the converter into a low voltage and being insulated from the high voltage battery; and a rectifying unit for rectifying and smoothing the AC voltage and charging the low-voltage battery with the rectified AC voltage, a transformer 100 for an LDC of an electric vehicle according to an embodiment of the present invention is configured to include: a plate-type primary coil 110 for receiving current from the high voltage battery of the electric vehicle; a lower secondary coil element 120 provided to be tightly attached to the bottom surface of the primary coil 110 under the primary coil 110 to generate an induced current by the current flowing through the primary coil 110 and supply the induced current to the electrical components of the electric vehicle; and an upper secondary coil element 130 provided to be tightly attached to the top surface of the primary coil 110 to generate an induced current by the current flowing through the primary coil 110 and supply the induced current to the electrical components of the electric vehicle.

The primary coil 110 is configured of a fusion-type fine line bunch wire 110' manufactured by coating an insulative coalescing agent (e.g., polyamide material) on a copper fine line bunch made by twisting several strands of copper fine lines (of course, according to embodiments, it may be coated with an insulating material before coating the insulative coalescing agent, or the insulative coalescing agent itself may be made of an insulating material), and is configured to include: an input wire unit 111 connected to the high voltage battery of the electric vehicle specifically, the converter of the LDC, and formed of a straight fusion-type fine line bunch wire 110'; a primary side winding unit 112 formed to be extended from the input wire unit 111 by winding the fusion-type fine line bunch wire 110' a plurality of times in a plate shape to form a first central hole C1 at the center; and a straight output wire unit 113 connected to the high voltage battery of the electric vehicle specifically, the converter of the LDC at an end of the primary side winding unit 112.

The primary side winding unit 112 is formed in a hard state in which the fusion-type fine line bunch wire 110' is bonded to and aligned with each other at the same time by fusion bonding by automatically winding the fusion-type fine line bunch wire 110' in a plate shape by a winding jig so that the fusion-type fine line bunch wire 110' may be aligned in a horizontal direction or/and vertical direction while being tightly attached to each other (without having uneven side surfaces), and then melting the coated insulative coalescing agent with a solvent (e.g., alcohol) or by applying heat, and curing it.

According to the specific configuration of the primary coil 110 as described above, high current and high voltage may be supplied with a small size.

Since the adhesiveness of the primary coil 110 itself of the LDC transformer is increased as the primary coil 110 of the LDC transformer is formed by fusing, and the adhesiveness between the primary coil 110 and a secondary coil 120 and 130 s also increased itself as described above, loss is reduced, and efficiency is further improved.

In addition, the height of a product may be further reduced (60% lower than a conventional LDC transformer), and at the same time, the size of the product may be further reduced (55% smaller than the conventional LDC transformer).

In addition, since the height of the LDC transformer is lowered and the size of the product is reduced, the size of the LDC itself can be reduced, and therefore, as the space occupied in the electric vehicle is reduced and the weight is also lowered, product competitiveness of the LDC in the electric vehicle is improved.

Since the production itself of the primary coil 110 of the LDC transformer may be performed by a winding jig as described above, production of the primary coil 110 of the LDC transformer may be automated, and therefore, the assembly process is reduced (30% of the assembly process is reduced compared to the production process of conventional LDC transformers), and productivity can be significantly improved, and accordingly, price competitiveness is improved.

In addition, since it does not need to doubly adopt a separate bobbin or casing to hold the primary winding, the heating characteristic is excellent, and EMI performance is also improved.

The lower secondary coil 120 is configured to include a plate-shaped lower copper plate coil 121 formed of a non-flexible copper plate larger than a reference thickness and a reference cross-sectional area, and a lower insulation unit 122 of a synthetic resin material, having a lower central hole 120*a* formed therein, and embedded with the lower copper plate coil 121 excluding lower terminals 121*a* and 121*b* of the lower copper plate coil 121.

The upper secondary coil 130 is configured to include a plate-shaped upper copper plate coil 131 formed of a non-flexible copper plate larger than a reference thickness and a reference cross-sectional area, and an upper insulation unit 132 of a synthetic resin material, having an upper central hole 130*a* formed therein, and embedded with the upper copper plate coil 131 excluding upper terminals 131*a* and 131*b* of the upper copper plate coil 131.

As the bottom surface of the primary coil 110 is tightly attached to the top surface 120*b* of the lower secondary coil element i.e., it is also the top surface of the lower insulation unit 122, and the top surface of the primary coil 110 is tightly attached to the bottom surface 130*b* of the upper secondary coil element i.e., it is also the bottom surface of the upper insulation unit 132, the primary coil 110 is provided to be tightly attached between the lower secondary coil element 120 and the upper secondary coil element 130.

As the non-flexible thick copper plate is configured as the secondary coil as described above, it is advantageous for conversion of large current and high voltage.

The lower copper plate coil 121 is configured to include a lower first terminal 121*a* having a terminal hole 121*a*' formed therein, a downward bent unit 121*d* formed to be bent downward from the lower first terminal 121*a*, a lower winding unit 121*c* formed to be bent in a horizontal direction at an end of the downward bent unit 121*d*, and wound once, and a lower second terminal 121*b* formed to be extended from an end of the lower winding unit 121*c* to have a terminal hole 121*b*' formed therein.

In addition, the upper copper plate coil 131 is configured to includes an upper first terminal 131 having a terminal hole 131*a*' formed therein, an upper winding unit 131*c* formed to be extended from the upper first terminal 131*a* in a horizontal direction, and wound once, an upward bent unit 131*d* formed to be bent upward at an end of the upper winding unit 131*c*, and an upper second terminal 131*b* formed to be bent in a horizontal direction at an end of the upward bent unit 131*d* to have a terminal hole 131*b*' formed therein.

In addition, when the primary coil 110 is provided to be tightly attached between the lower secondary coil element 120 and the upper secondary coil element 130, the lower second terminal 121*b*, the upper second terminal 131*b*, and the downward bent unit 121*d* are formed so that the terminal hole 121*b*' of the lower second terminal 121*b* and the terminal hole 131*b*' of the upper second terminal 131*b* communicate with each other, and the lower second terminal 121*b* and the upper second terminal 131*b* are tightly attached to be in surface contact with each other at the same position in a vertical direction (height direction), and the lower first terminal 121*a*, the upper first terminal 131*a*, and the upward bent unit 131*d* are formed so that the lower first terminal 121*a* and the upper first terminal 131*a* are placed at the same position in a horizontal direction.

According to this, the height of the transformer may be lowered, and the size may be reduced.

As the secondary coil elements may be connected in series and the terminals for series connection are in surface contact, reliability of the series connection is guaranteed.

Fastening members 141 and 142 are further provided to fasten the lower second terminal 121*b* and the upper second terminal 131*b* to be tightly attached to each other in a surface shape without a gap as the terminal hole 121*b*' of the lower second terminal 121*b* and the terminal hole 131*b*' of the upper second terminal 131*b* are simultaneously fastened.

According to this, as a gap does not occur between the lower second terminal 121*b* and the upper second terminal 131*b*, surface attachment can be accomplished more securely.

The fastening members 141 and 142 are configured of a fastening bolt 141 inserted into both the terminal hole 121*b*' of the lower second terminal 121*b* and the terminal hole 131*b*' of the upper second terminal 131*b*, and a fastening nut 142 bolt-coupled to the fastening bolt 141 exposed downward from the terminal hole 121*b*' of the lower second terminal 121*b* and the terminal hole 131*b*' of the upper second terminal 131*b*.

A lower mounting unit 121*e* formed to be extended from the center of the lower first terminal 121*a* toward the outside and having a lower mounting hole 121*e*' formed therein, and an upper mounting unit 131*e* formed to be extended from the center of the upper first terminal 131*a* toward the outside and having an upper mounting hole 131*e*' formed therein are further provided.

As the mounting units 121*e* and 131*e* are formed on the terminals themselves of the lower copper plate coil and the upper copper plate coil without adopting separate mounting members, the LDC transformer can be mounted easily and conveniently, and the product itself of the transformer may be more compact.

A bottom mounting unit 121*f* formed to be extended from one side of the lower winding unit 121*c* to protrude in a horizontal direction and having a bottom mounting hole 121*f*' formed therein is further provided.

According to this, since the transformer can be directly mounted on the LDC casing itself, mounting instability of the product generated due to its own vibration or shaking can be solved.

A lower mounting member (not shown) (e.g., a mounting pin, a mounting bolt, or the like) may be coupled in the lower mounting hole 121*e*'. In the same way, an upper mounting member (not shown) (e.g., a mounting pin, a mounting bolt, or the like) may be coupled in the upper mounting hole 321*e*'. In addition, a bottom mounting member (not shown) (e.g., a mounting pin, a mounting bolt, or the like) may be coupled in the floor mounting hole 121*f*'.

A first insulation insertion ring 171 inserted into the lower mounting hole 121*e*' of the lower mounting unit 121*e* to insulate between the lower mounting member (not shown) and the lower copper plate coil 121, and a second insulation insertion ring 172 inserted into the upper mounting hole 131*e*' of the upper mounting unit 131*e* to insulate between the upper mounting member (not shown) and the upper copper plate coil 131 are further provided.

A third insulation insertion ring 173 inserted into the bottom mounting hole 121*f*' of the bottom mounting unit 121*f* to insulate between the bottom mounting member (not shown) and the lower copper plate coil 121 is further provided.

Specifically, the first insulation insertion ring 171 is configured of a first body unit 171*a*, through which a first coupling hole 171*c* is formed, inserted into the lower mounting hole 121*e*', and a first flange 171*b* formed on the outer circumference of the upper end of the first body unit 171*a* and stopped at the top surface of the lower mounting unit 121*e*.

In the same manner, the second insulation insertion ring 172 is configured of a second body unit 172*a*, through which a second coupling hole 172*c* is formed, inserted into the upper mounting hole 131*e*', and a second flange 172*b* formed on the outer circumference of the upper end of the second body unit 172*a* and stopped at the top surface of the upper mounting unit 131*e*.

In the same manner, the third insulation insertion ring 173 is configured of a third body unit 173*a*, through which a third coupling hole 173*c* is formed, inserted into the bottom mounting hole 121*f*', and a third flange 173*b* formed on the outer circumference of the upper end of the third body unit 173*a* and stopped at the top surface of the bottom mounting unit 121*f*.

A wire guider 151 formed to be extended from the lower insulation unit 122 so that the first input wire unit 111 and a first output wire unit 113 may be stably wired without being disconnected, and a first wire cover 152 formed to be extended from the upper insulation unit 132 to cover the wire guider 151 by being combined with the wire guider 151 to press and protect the first input wire unit 111 and the first output wire unit 113 arranged in the wire guider 151 are further provided.

According to this, disconnection of the first input wire unit 111 and the first output wire unit 113 can be prevented, and at the same time, wiring can be stably and neatly performed.

The wire guider 151 is configured to include a bottom unit 151*a* formed to be extended from the lower insulation unit 122, a pair of outer ribs 151*b* spaced apart from each other and formed to protrude upward from the bottom unit 151*a*, and a partition rib 151*c* formed in the middle between the pair of outer ribs 151*b* to protrude upward from the bottom unit 151*a* to partition and branch the first input wire unit 111 and the first output wire unit 113.

In addition, a first guide channel Ch1 is formed by any one outer rib 151*b* among the pair of outer ribs, the partition rib 151*c*, and the wire cover 152, and the first guide channel Ch1 guides inlet of the first input wire unit 111 and stably wires while placing the first input wire unit 111. In addition, a second guide channel Ch2 is formed by the other outer rib 151*b* among the pair of outer ribs, the partition rib 151*c*, and the wire cover 152, and the second guide channel Ch2 guides inlet of the first output wire unit 113 and stably wires while placing the first output wire unit 113.

According to this, wiring can be performed more stably for the first input wire unit 111 and the first output wire unit 113.

An outer protrusion 151*d* formed to protrude from an end of the outer rib 151*b* in a direction perpendicular to the wiring direction (longitudinal direction), and a partition protrusion 151*e* formed to protrude from an end of the partition rib 151*c* in a direction perpendicular to the wiring direction (longitudinal direction) to form a space with the outer protrusion 151*d* are further provided.

Insertion holes 151*f* are formed between the outer protrusions 151*d* and the partition protrusion 151*e* to hold the first input wire unit 111 and the first output wire unit 113.

According to this, as the first input wire unit 111 and the first output wire unit 113 may be firmly held in the insertion holes 151*f*, gap or movement of the first input wire unit 111 and the first output wire unit 113 can be prevented.

On the outer protrusion 151*d*, an outer slope guide surface 151*d*' narrowed toward the inside is formed to be inclined in a direction in which the first input wire unit 111 and the first output wire unit 113 are drawn out to be smoothly guided to the insertion hole 151*f*, and on the partition protrusion 151*e*, a partition slope guide surface 151*e*' narrowed toward the inside is formed to be inclined in a direction in which the first input wire unit 111 and the first output wire unit 113 are drawn out to be smoothly guided to the insertion hole 151*f*.

According to this, the first input wire unit 111 and the first output wire unit 113 wired while being guided to the first and second guide channels Ch1 and Ch2 so as to be held in the insertion holes 151*f* may be guided to the insertion holes 151*f* more easily and conveniently.

A positioning protrusion 161 formed in the lower insulation unit 122 to protrude upward, and a positioning concave groove 162 formed in the upper insulation unit 132 to be combined with the positioning protrusion 161 are further provided at one or more locations.

The top surface 120*b* of the lower secondary coil element and the bottom surface 130*b* of the upper secondary coil element are flat surfaces, and an outer protrusion frame 124 formed to protrude upward from the lower insulation unit 122 is further provided outside the top surface 120*b* of the lower secondary coil element to hold the outer circumference of the primary coil 110 interposed to be tightly attached between the top surface 120*b* of the lower secondary coil element and the bottom surface 130*b* of the upper secondary coil element, and an inner protrusion frame 123 in contact with the inner circumferential surface of the first central hole C1 of the primary coil 110 to hold the inner circumferential surface of the first central hole C1 of the primary coil 110 is further provided.

Preferably as shown the drawing, the inner protrusion frame 123 is preferably formed to protrude along the first central hole 120*a*.

In addition, the inner protrusion frame 123 holds the primary coil 110 to be placed at the same position as the upper and lower copper plate coils 131 and 121 in a vertical direction i.e., a position aligning the center in a vertical direction so that the center of the primary coil 110 is aligned with those of the upper and lower copper plate coils 131 and 121 without being unaligned.

Preferably, the upper secondary coil element 130 presses the primary coil 110 to prevent the gap or movement of the primary coil 110.

The lower insulation unit 122 is formed by insert molding of resin injection after inserting the lower copper plate coil 121 into an injection mold, and the upper insulation unit 132 is formed by insert molding of resin injection after inserting the upper copper plate coil 131 into an injection mold.

The lower insulation unit 122 and the upper insulation unit 132 are formed by insert molding of resin injection after inserting the lower copper plate coil 121 and the upper copper plate coil 131 into an injection mold Preferably, the inner protrusion frame 123 and the outer protrusion frame 124 are formed to be integrated with the lower insulation unit 122 by insert molding.

According to this, there is an advantage in that the inner protrusion frame 123, the outer protrusion frame 124, and the lower insulation unit 122 may be simultaneously formed in a single injection process.

The lower copper plate coil 121 and the upper copper plate coil 131 are formed by winding once a non-flexible copper plate larger than a reference thickness and a reference cross-sectional area.

The lower copper plate coil 121 and the upper copper plate coil 131 are preferably formed at a thickness of 1.8 to 2.2 mm.

More preferably, the lower copper plate coil 121 and the upper copper plate coil 131 are formed at a thickness of 2.0 mm.

The fusion-type fine line bunch wire 110' of the primary coil 110 is formed by twisting 80 to 120 strands of copper fine lines having a diameter of 0.08 to 0.12 mm.

According to this, it is possible to exhibit performance of high current and high voltage with optimal thickness and an optimal number of copper fine lines.

More preferably, the fusion-type fine line bunch wire 110' of the primary coil 110 is formed by twisting 100 strands of copper fine lines having a diameter of 0.1 mm.

The primary coil 110 is wound so that both the input wire unit 111 and the output wire unit 113 are disposed in the same direction, toward the high voltage battery of the electric vehicle.

An upper magnetic core M1 provided above the upper secondary coil element 130 and a lower magnetic core M2 provided under the lower secondary coil element 120 are further provided.

The transformer for an LDC of an electric vehicle of the present invention having the configuration as described above has the following effects.

First, there is an effect of transforming high current and high voltage with a simple configuration and a small size.

Second, since the adhesiveness of the primary coil itself of the LDC transformer may be increased as the primary coil 110 of the LDC transformer is formed by fusing, and the loss is reduced by decreasing the distance and increasing the adhesiveness between the primary coil and the secondary coil, the efficiency is further improved. In addition, there is an effect of further reducing the height of a product (60% lower than a conventional LDC transformer), and at the same time, further reducing the size of the product.

Third, since the height of the LDC transformer is lowered and the size of the product is reduced, the size of the LDC itself can be reduced, and therefore, as the space occupied in the electric vehicle is reduced and the weight is also lowered, there is an effect of improving product competitiveness of the LDC in the electric vehicle.

Fourth, since the production itself of the primary coil of the LDC transformer may be performed by a winding jig, production of the primary coil of the LDC transformer can be automated, and therefore, the assembly process is reduced, and productivity can be significantly improved, and accordingly, there is an effect of increasing price competitiveness.

Fifth, since it does not need to doubly adopt a separate bobbin to hold the primary winding, the heating characteristic is excellent, and there is also an effect of improving EMI performance.

Sixth, there is an effect of connecting the secondary coil elements in series with a simple configuration, and guaranteeing reliability of contact between the terminals for series connection.

Seventh, as the mounting units are formed on the terminals themselves of the lower copper plate coil and the upper copper plate coil without adopting separate mounting members, there is an effect of mounting the LDC transformer easily and conveniently, and reducing the product size of the transformer more compactly.

The preferred embodiments according to the present invention have been reviewed as described above, and it is self-evident to those skilled in the art that the present invention can be implemented in other specific forms, in addition to the embodiments described above, without changing the technical spirit or essential characteristics. Therefore, the embodiments described above should be understood as being illustrative rather than restrictive.

The scope of the present invention is indicated by the following claims, rather than the above detailed description, and all changes or modifications derived from the meaning and scope of the claims and equivalent concepts thereof should be construed as being included in the scope of the present invention.

What is claimed is:

1. A transformer for a low DC-DC converter (LDC) of an electric vehicle, the LDC configured to supply power from a high voltage battery of the electric vehicle to electrical components of the electric vehicle, the transformer comprising:

a primary coil configured to receive a current from the high voltage battery of the electric vehicle;

a lower secondary coil element attached to a bottom surface of the primary coil to generate an induced current by the current flowing through the primary coil and supply the induced current to the electrical components of the electric vehicle; and an upper secondary coil element attached to a top surface of the primary coil to generate the induced current by the current flowing through the primary coil and supply the induced current to the electrical components of the electric vehicle, wherein the primary coil includes a fine line bunch wire having an insulative coalescing agent and a copper fine line bunch, and further includes:

an input wire connected to the high voltage battery of the electric vehicle, and having a straight fine line bunch wire;

a primary side winder extending from the input wire and winding the fine line bunch wire a plurality of times in a plate shape to have a first central hole at a center of the fine line bunch wire wound in the plate shape; and a straight output wire connected to the high voltage battery of the electric vehicle at an end of the primary side winder, wherein the lower secondary coil element includes:

a lower copper plate coil having a non-flexible copper plate and lower terminals; and a lower insulation unit having a first synthetic resin material, a lower central hole formed therein, and the lower copper plate coil embedded therein excluding the lower terminals, wherein the upper secondary coil element includes:

an upper copper plate coil having a non-flexible copper plate and upper terminals; and an upper insulation unit having a second synthetic resin material, an upper central hole formed therein, and the upper copper plate coil embedded therein excluding the upper terminals, wherein, as the bottom surface of the primary coil is attached to a top surface of the lower secondary coil element and the top surface of the primary coil is attached to a bottom surface of the upper secondary coil element, the primary coil is attached between the lower secondary coil element and the upper secondary coil element, wherein the lower copper plate coil includes:

a lower first terminal having a first terminal hole formed therein;

a downward bent portion which is downwardly bent from the lower first terminal;

a lower winding portion bent horizontally at an end of the downward bent portion, so as to be wound once; and a lower second terminal extending from an end of the lower winding portion and having a second terminal hole formed therein, wherein the upper copper plate coil includes:

an upper first terminal having a third terminal hole formed therein;

an upper winding portion extending horizontally from the upper first terminal, so as to be wound once;

an upward bent portion which is upwardly bent at an end of the upper winding portion; and an upper second terminal bent horizontally at an end of the upward bent portion and having a fourth terminal hole formed therein, wherein, when the primary coil is attached between the lower secondary coil element and the upper secondary coil element, the lower second terminal, the upper second terminal and the downward bent portion are configured such that the second terminal hole and the fourth terminal hole communicate with each other, and that the lower second terminal and the upper second terminal are attached to be in surface contact with each other, so as to be disposed in a vertical direction with respect to each other, and the lower first terminal, the upper first terminal and the upward bent portion are configured such that the lower first terminal and the upper first terminal are placed in a horizontal direction with respect to each other.

2. The transformer according to claim 1, wherein the primary side winder is in a hard state in which the fine line bunch wire is bonded to and aligned with each other.

3. The transformer according to claim 1, further comprising fasteners fastening the lower second terminal and the upper second terminal to be attached to each other on a surface without a gap, wherein the fasteners penetrate the second terminal hole of the lower second terminal and the fourth terminal hole of the upper second terminal to simultaneously fasten the lower second terminal and the upper second terminal.

4. The transformer according to claim 1, further comprising:

a lower mount extending from a center of the lower first terminal and disposed at a periphery of the lower first terminal, and having a lower mounting hole formed therein; and an upper mount extending from a center of the upper first terminal and disposed at a periphery the upper first terminal, and having an upper mounting hole formed therein.

5. The transformer according to claim 1, further comprising:

a first output wire;

a wire guider extending from the lower insulation unit such that the first input wire and the first output wire are wired without being disconnected; and a first wire cover extending from the upper insulation unit, covering the wire guider, and pressing and protecting the first input wire and the first output wire, wherein the first input wire and the first output wire are arranged in the wire guider.

6. The transformer according to claim 1, further comprising:

an outer protrusion frame protruding upward from the lower insulation unit and disposed at a periphery of the top surface of the lower secondary coil element, so as to hold an outer circumference of the primary coil interposed between the top surface of the lower secondary coil element and the bottom surface of the upper secondary coil element; and an inner protrusion frame in contact with an inner circumferential surface of the fine line bunch wire having the first central hole to hold the inner circumferential surface.

7. The transformer according to claim 1, wherein the lower copper plate coil and the upper copper plate coil are formed by winding once a non-flexible copper plate having a thickness and a cross-sectional area that are respectively larger than a reference thickness and a reference cross-sectional area.

* * * * *